United States Patent
Alonso-Miralles et al.

(10) Patent No.: US 9,752,595 B2
(45) Date of Patent: Sep. 5, 2017

(54) NACELLE CORE WITH INSERT

(71) Applicant: Rohr, Inc., Chula Vista, CA (US)

(72) Inventors: Jose S. Alonso-Miralles, Chula Vista, CA (US); Charles M. Biset, San Diego, CA (US); Christian Soria, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/931,508

(22) Filed: Nov. 3, 2015

(65) Prior Publication Data
US 2017/0122341 A1     May 4, 2017

(51) Int. Cl.
| B64D 29/00 | (2006.01) |
| F04D 29/66 | (2006.01) |
| F04D 29/32 | (2006.01) |
| F04D 29/52 | (2006.01) |
| B64D 27/10 | (2006.01) |

(52) U.S. Cl.
CPC ........... *F04D 29/665* (2013.01); *B64D 29/00* (2013.01); *F04D 29/325* (2013.01); *F04D 29/522* (2013.01); *B64D 27/10* (2013.01); *F05B 2220/303* (2013.01); *F05B 2250/283* (2013.01); *F05B 2260/96* (2013.01)

(58) Field of Classification Search
CPC ...... B64D 29/00; F04D 29/325; F04D 29/522
USPC ........................................................ 181/292
See application file for complete search history.

(56) References Cited

U.S. PATENT DOCUMENTS

| 3,910,374 | A  | * | 10/1975 | Holehouse  | G10K 11/172 |
|           |    |   |         |            | 181/292 |
| 4,265,955 | A  | * | 5/1981  | Harp       | B29D 24/005 |
|           |    |   |         |            | 181/292 |
| 5,445,861 | A  |   | 8/1995  | Newton et al. | |
| 5,912,442 | A  | * | 6/1999  | Nye        | G10K 11/172 |
|           |    |   |         |            | 181/286 |
| 5,997,985 | A  | * | 12/1999 | Clarke     | B32B 3/12 |
|           |    |   |         |            | 181/286 |
| 6,274,216 | B1 |   | 8/2001  | Gonidec et al. | |
| 7,074,287 | B2 |   | 7/2006  | Belleguic et al. | |
| 7,401,682 | B2 | * | 7/2008  | Proscia    | F02K 1/827 |
|           |    |   |         |            | 181/214 |
| 7,631,727 | B2 |   | 12/2009 | Thomas et al. | |
| 8,367,183 | B2 |   | 2/2013  | Take et al. | |
| 8,567,558 | B2 | * | 10/2013 | Nakajima   | E04B 1/86 |
|           |    |   |         |            | 181/210 |
| 8,727,072 | B2 |   | 5/2014  | Ayle       | |
| 8,931,588 | B2 |   | 1/2015  | Murray     | |
| 9,068,345 | B2 | * | 6/2015  | Ichihashi  | E04B 1/84 |
| 2004/0163888 | A1 | * | 8/2004 | Johnson    | B64D 29/00 |
|           |    |   |         |            | 181/292 |
| 2012/0037449 | A1 | * | 2/2012 | Ayle       | G10K 11/172 |
|           |    |   |         |            | 181/292 |

(Continued)

*Primary Examiner* — Forrest M Phillips
(74) *Attorney, Agent, or Firm* — O'Shea Getz P.C.

(57) ABSTRACT

Aspects of the disclosure are directed to a structure comprising: a plurality of cells, a first non-permeable insert in a first cell of the plurality of cells, the first insert configured to constrict, by at least a first threshold amount, a flow of fluid in the first cell such that: acoustic power over a frequency range is attenuated by the structure by at least a second threshold amount, and a resonant frequency associated with the structure is shifted by at least a third threshold amount.

19 Claims, 13 Drawing Sheets

(56) References Cited

U.S. PATENT DOCUMENTS

2012/0168248 A1\* 7/2012 Burak ................... F01D 25/162
  181/292
2015/0027629 A1 1/2015 Butler et al.

\* cited by examiner

NACELLE CORE WITH INSERT

BACKGROUND

Figure 1:
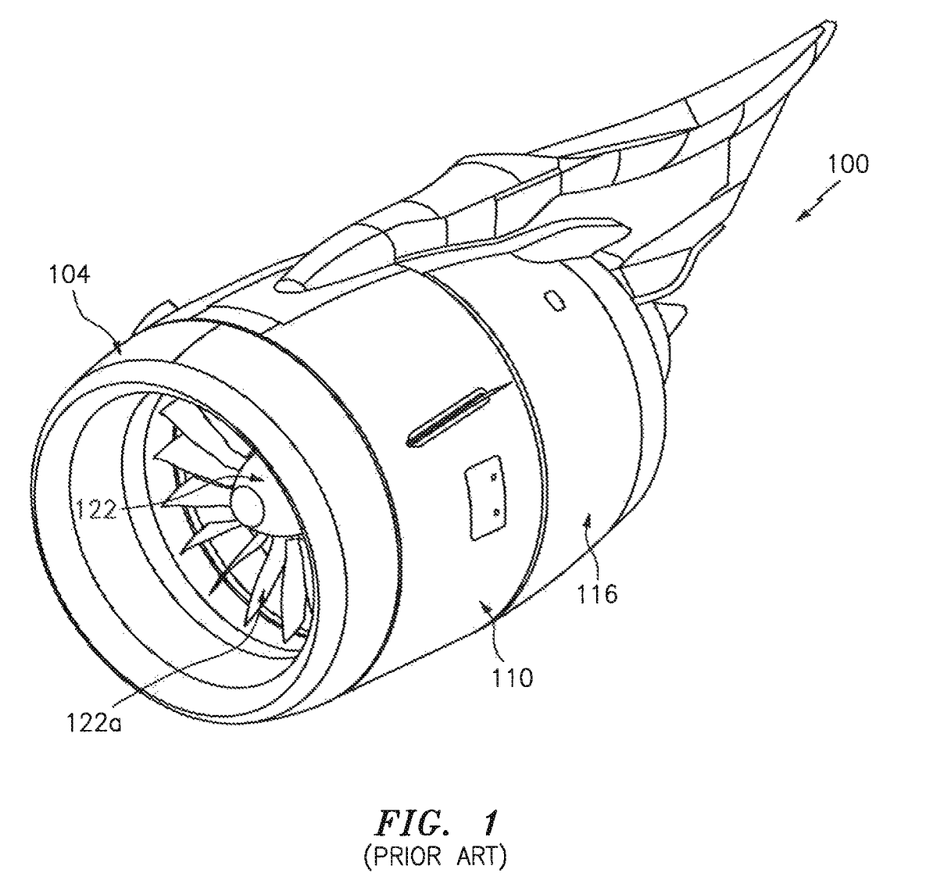
FIG. 1 illustrates an aircraft nacelle in accordance with the prior art.

FIG. 1 illustrates a nacelle 100 that is used to house a typical turbofan propulsion engine for a commercial airliner. The nacelle 100 provides aerodynamic surfaces for smooth flow of air into and around the engine, and helps create a bypass air duct for the fan air, and may include a thrust reverser to slow the aircraft. The nacelle 100 may be fabricated using various types of structures and materials. For example, some of the nacelle 100 structures may be formed from metal or composite sandwich panels having an inner skin and an outer skin, and a core material forming many small cells between the skins, with the cell walls bonded or otherwise joined to the skins and typically positioned normal thereto. In strategic locations, some of the sandwich panels may constitute acoustic sandwich panels which damp noise emitted by the engine to quiet the aircraft and reduce output, community noise. Acoustic sandwich panels are sandwich panels with perforations formed in one of the skins, such that the individual cells of the core form resonating chambers for damping sound waves, in a known manner.

The nacelle 100 typically is comprised of, for example, an inlet cowl 104, a fan cowl 110, a thrust reverser 116, etc. Air enters the nacelle 100 at the inlet 104 where it is received/processed by a fan 122. At least a first portion of the air output by the fan 122 may be subjected to combustion by the engine. A second portion of the air output by the fan 122 might not undergo combustion (e.g., may bypass the engine).

As nacelle technology continues to mature, trends have indicated that the fan 122 size/diameter is increasing. The lower rotational speeds of a larger fan 122 are associated with a reduction in operating noise frequencies. The increase in the size of fan blades 122a also generate greater tonal noise levels. Conventionally, to accommodate the changes to the frequency/noise levels associated with the use of a larger fan 122, the thickness of acoustic sandwich panels is increased. This limits the feasibility to package acoustic sandwich structures within the most ideal or required nacelle loft lines. Therefore, there is a need in the art for an improved sound attenuation structure for an aircraft propulsion system that attenuates lower frequency noise without being excessively thick.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a structure comprising: a plurality of cells, a first non-permeable insert in a first cell of the plurality of cells, the first insert configured to constrict, by at least a first threshold amount, a flow of fluid in the first cell such that: acoustic power over a frequency range is attenuated by the structure by at least a second threshold amount, and a resonant frequency associated with the structure is shifted by at least a third threshold amount. In some embodiments, the first threshold amount is 90%. In some embodiments, the frequency range corresponds to 0-10 KHz. In some embodiments, the structure further comprises a second non-permeable insert. In some embodiments, the first insert is located at a first distance as measured from a bottom of the first cell, and the second insert is located at a second distance as measured from the bottom of the first cell. In some embodiments, the first distance and the second distance are different. In some embodiments, the second insert is located in the first cell. In some embodiments, the second insert is located in a second cell of the plurality of cells. In some embodiments, each of the plurality of cells has a substantially hexagonal shape, and the cells are arranged relative to one another to form a honeycomb profile. In some embodiments, outer edges of the first insert adhere to the shape of the first cell. In some embodiments, the first insert defines a hole therethrough. In some embodiments, the first insert includes at least one edge proximate the hole that is substantially round. In some embodiments, the first insert includes at least one edge proximate the hole that is substantially straight. In some embodiments, the structure further comprises a second non-permeable insert and a third non-permeable insert in a second cell of the plurality of cells. In some embodiments, the first insert is substantially located at the center of the first cell, and the second insert is substantially located at the top of the second cell, and the third insert is substantially located at the bottom of the second cell. In some embodiments, the frequency range and the second threshold amount are based on at least one of: a count of inserts within at least one of the cells, a location of the first insert within the first cell, a size of the first insert, a size of a hole defined by the first insert, a shape of the first insert, or a shape of the first cell in some embodiments, the structure is configured to be incorporated in a nacelle of an aircraft. In some embodiments, the structure is configured to be incorporated in at least one of a translating sleeve or a blocker door. In some embodiments, at least one of the frequency range or the second threshold amount is based on a size of a fan housed within the nacelle. In some embodiments, the frequency range corresponds to 0-1 KHz.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a shift in the frequency profile (in an amount greater than a threshold) of one or more cells that are used as part of an acoustic structure of a nacelle of an aircraft. In some embodiments, this shift may be obtained by a constriction insert in the fluid path of the cells and without changing (e.g., increasing) the depth of the cells. In this manner, flexibility may be provided in terms of an acoustic bond panel design procedure to target specific requirements while still adhering to overall nacelle packaging requirements. An insert may be non-permeable.

Figure 2A:
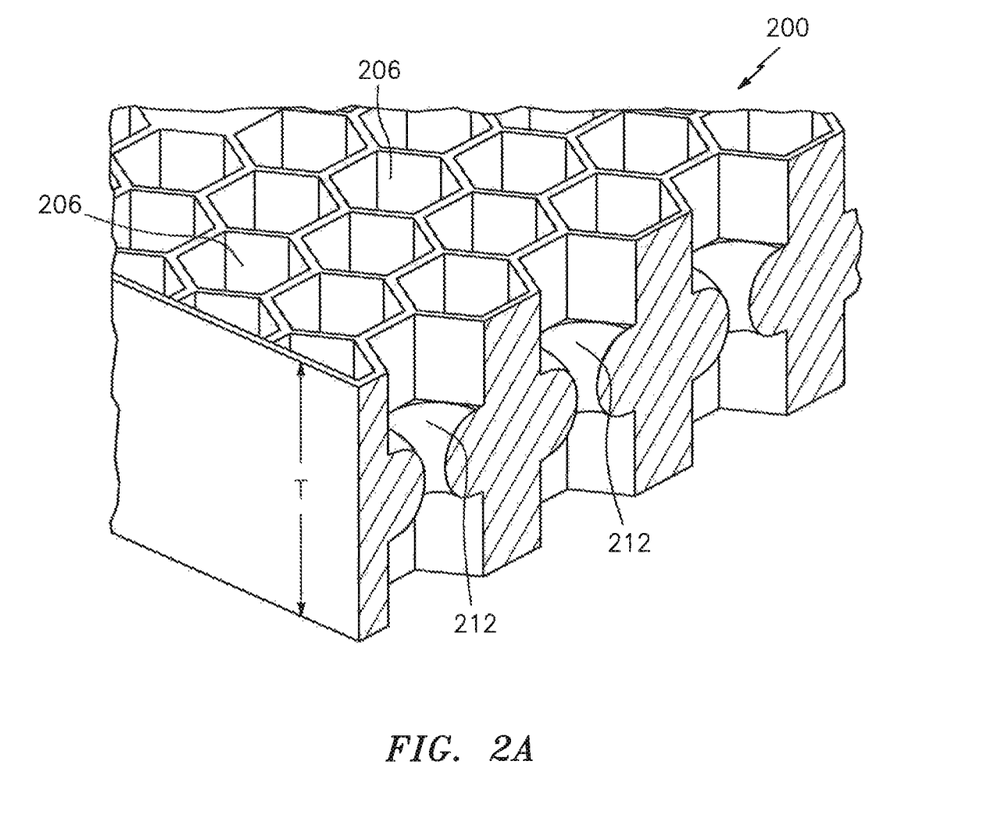
FIG. 2A illustrates a core incorporating cells and inserts in accordance with aspects of this disclosure.

Referring to FIG. 2A, an exemplary embodiment of a core 200 used in, e.g., a structure (e.g., a sleeve, a blocker door, etc.) of a nacelle is shown. The core 200 may be composed of a number of cells 206. Each of the cells 206 may adhere to one or more shapes/configurations. In the example shown in FIG. 2A, the cells 206 have a substantially hexagonal shape and are arranged relative to one another to form a honeycomb profile. Moreover, each of the cells 206 may have an associated height/depth/thickness. In the example shown in FIG. 2A, each of the cells 206 may have substantially the same thickness, which is generally denoted as 'T'; in some embodiments, the thickness associated with each of the cells 206 might not be the same.

Figure 2B:
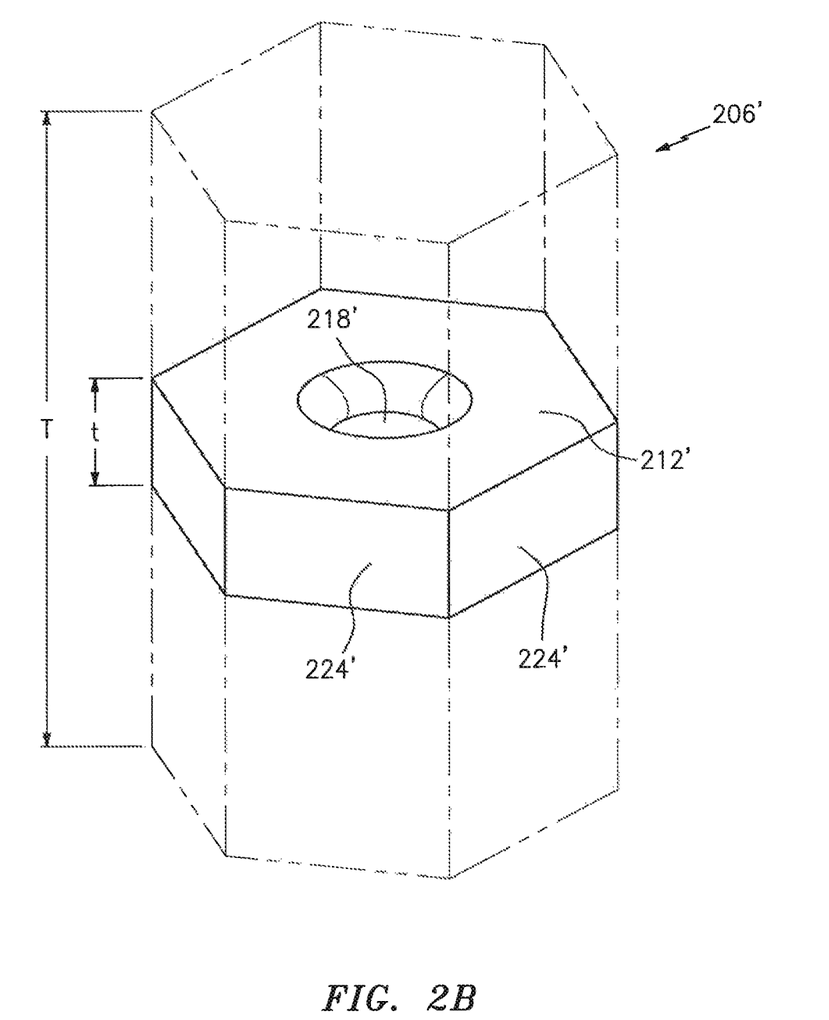
FIGS. 2B-2C illustrate a cell, which in some instances may correspond to a cell of FIG. 2A, incorporating an insert.
Figure 2C:
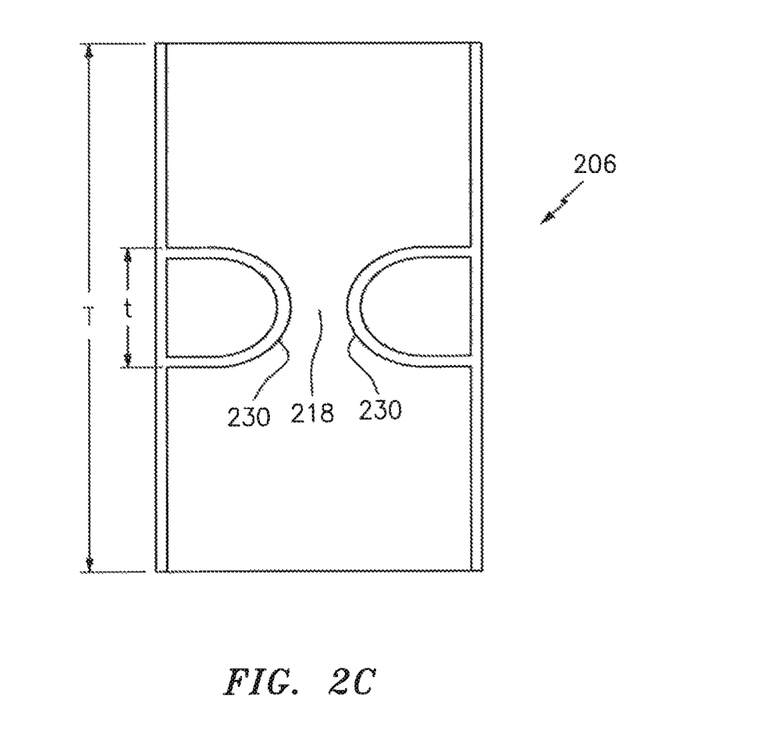

Referring to FIGS. 2A-2B, there may be a constriction insert 212, 212' located within the span/thickness 'T' of the cells 206, 206'. The insert 212, 212' may be substantially round with a hole 218, 218' in the center, much like a "donut" (FIG. 2A illustrates a section cut in which only one-half of the inserts 212 are shown; FIG. 2B illustrates an entirety of an insert 212' within the cell 206'). As shown in FIG. 2B, at least the outer edges 224' of the donut insert 212' may adhere to the hexagonal shape of the cell 206'. As shown in FIG. 2C, proximate the center hole 218 an insert 212 may have substantially rounded edges 230.

As shown in FIGS. 2B-2C, an insert 212, 212' may have a height/depth/thickness 't'. The thickness 't' of the insert 212, 212' may be different from (e.g., less than) the thickness 'T' of the cell 206, 206'. One or more values for the thickness 't' may be used.

Figure 3A:
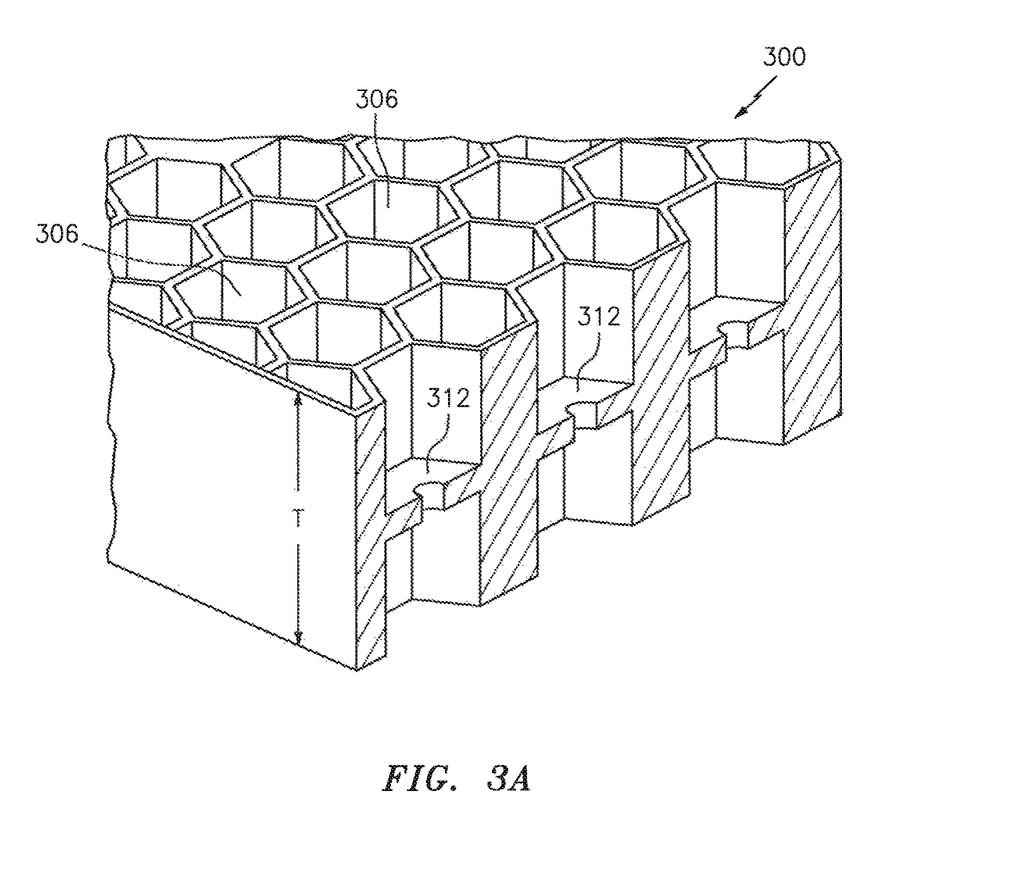
FIG. 3A illustrates a core incorporating cells and inserts in accordance with aspects of this disclosure.

Referring to FIG. 3A, an exemplary embodiment of a core 300 used in, e.g., a structure of a nacelle is shown. The core 300 may be composed of a number of cells 306. Each of the cells 306 may adhere to one or more shapes/configurations. In the example shown in FIG. 3A, the cells 306 have a substantially hexagonal shape and are arranged relative to one another to form a honeycomb profile. Moreover, each of the cells 306 may have an associated height/depth/thickness. In the example shown in FIG. 3A, each of the cells 306 may have substantially the same thickness, which is generally denoted as 'T'; in some embodiments, the thickness associated with each of the cells 306 might not be the same.

Figure 3B:
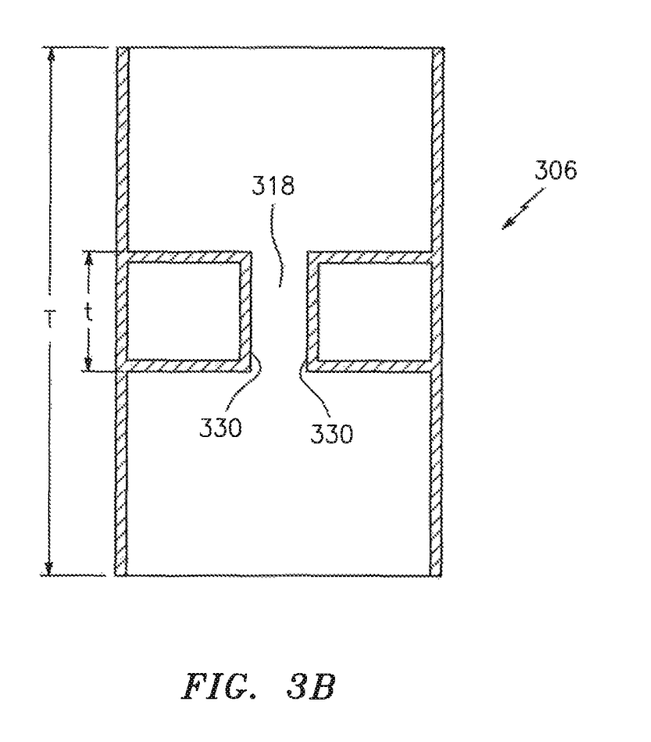
FIG. 3B illustrates a cell of FIG. 3A incorporating an insert.

There may be a constriction insert 312 located within the span/thickness 'T' of the cells 306 (in FIG. 3A, only one-half of the inserts 312 are shown). Referring to FIG. 313, the insert 312 may have a height/depth/thickness 't'. The thickness of the insert 312 may be different from (e.g., less than) the thickness 'T' of the cell 306. One or more values for the thickness may be used.

The outer edges of an insert 312 in proximity to the walls of a cell 306 may be similar in shape to the outer edges 224 of the insert 212 described above in connection with FIGS. 2A-2C. However, and as shown in FIG. 213, edges 330 of the insert 312 in proximity to a center hole 318 may be substantially straight.

Figure 8:
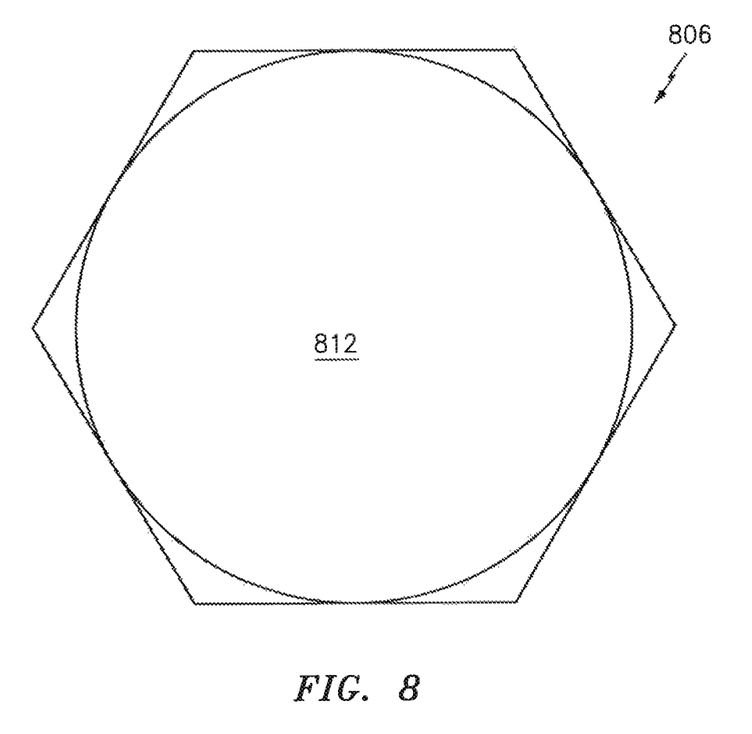
FIG. 8 illustrates a cell incorporating an insert in accordance with aspects of this disclosure.

Referring to FIG. 8, a cell 806 is shown. The cell 806 is Shown as incorporating a constriction insert 812. The insert 812 is substantially round, such that the combination of the cell 806 and the insert 812 may be referred to as a "ball-in" arrangement. Other shapes, such as a disk or a flat, non-spherical ball arrangement may be used.

The inserts 212, 312, and 812 are illustrative. One skilled in the art will appreciate based on a review of this disclosure that other shapes/form-factors for an insert that creates an effective constriction channel for the fluid path may be used.

Figure 4:
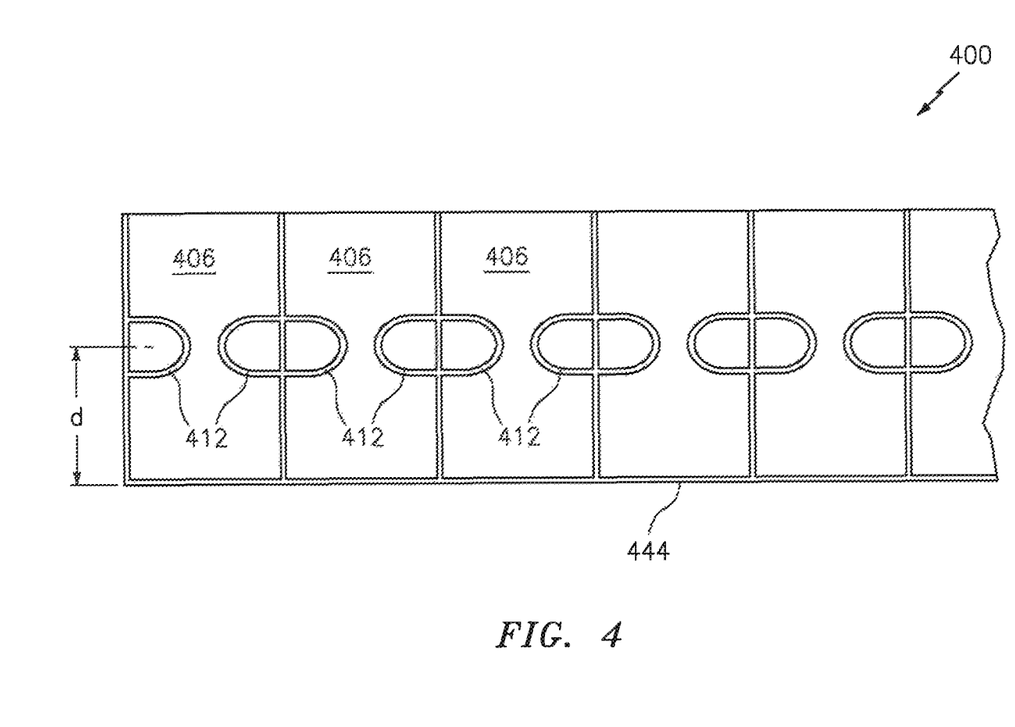
FIGS. 4-7 illustrate various patterns/arrangements of cores incorporating cells and inserts in accordance with aspects of this disclosure.

Referring to FIG. 4, a core 400 is shown. The core 400 may include a number of cells 406. The cells 406 may correspond to one or more of the cells described above. One or more of the cells 406 may include a constriction insert 412. An insert 412 may correspond to one or more of the inserts described above. In the example of FIG. 4, (a center-point of) the inserts 412 are shown as being located a distance 'd' that is illustratively measured from a floor/bottom 444 of the cells 406. While a common distance is shown, it is understood that multiple distances may be provided in some embodiments (e.g., a first insert 412 may be located a first distance 'd' and a second insert 412 may be located a second distance 'd' that is different from the first distance).

Figure 5:
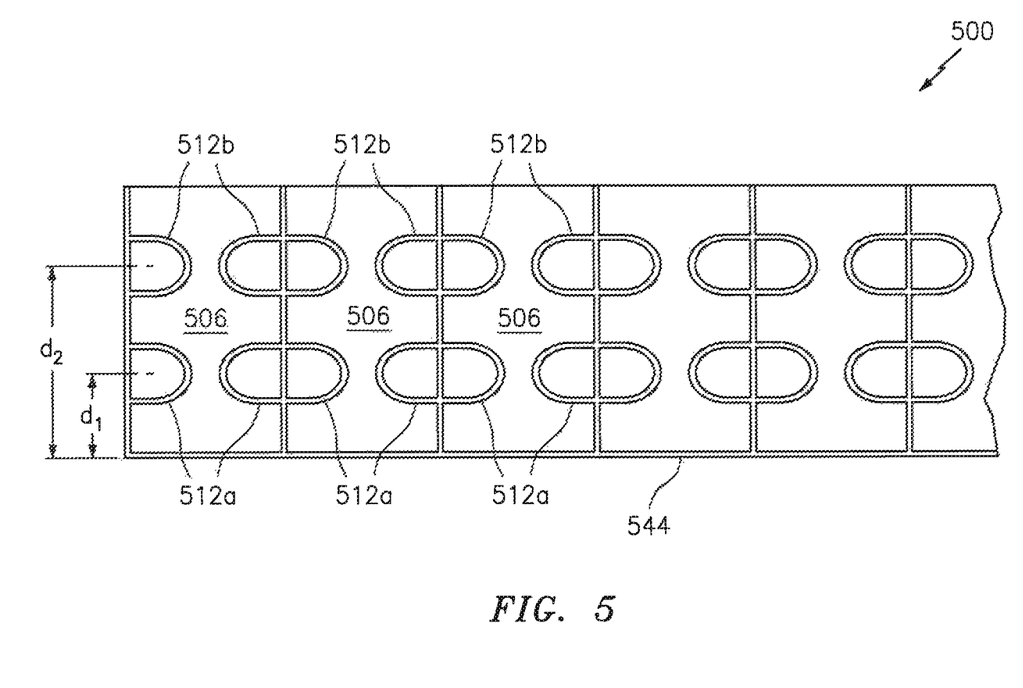

Referring to FIG. 5, a core 500 is shown. The core 500 may include a number of cells 506. The cells 506 may correspond to one or more of the cells described above. One or more of the cells 506 may include one or more inserts, such as for example inserts 512a and 512b. An insert 512a or 512b may correspond to one or more of the inserts described above. In the example of FIG. 5, (a center-point of) the inserts 512a are shown as being located a distance '$d_1$' that is illustratively measured from a floor/bottom 544 of the cells 506. Similarly, (a center-point of) the inserts 512b are shown as being located a distance '$d_2$' that is illustratively measured from the floor 544 of the cells 506. The distance '$d_1$' may be different from the distance '$d_2$'. Much like the above discussion regarding FIG. 4, there may be multiple values used for each of the distances $d_1$ and $d_2$.

Figure 6:
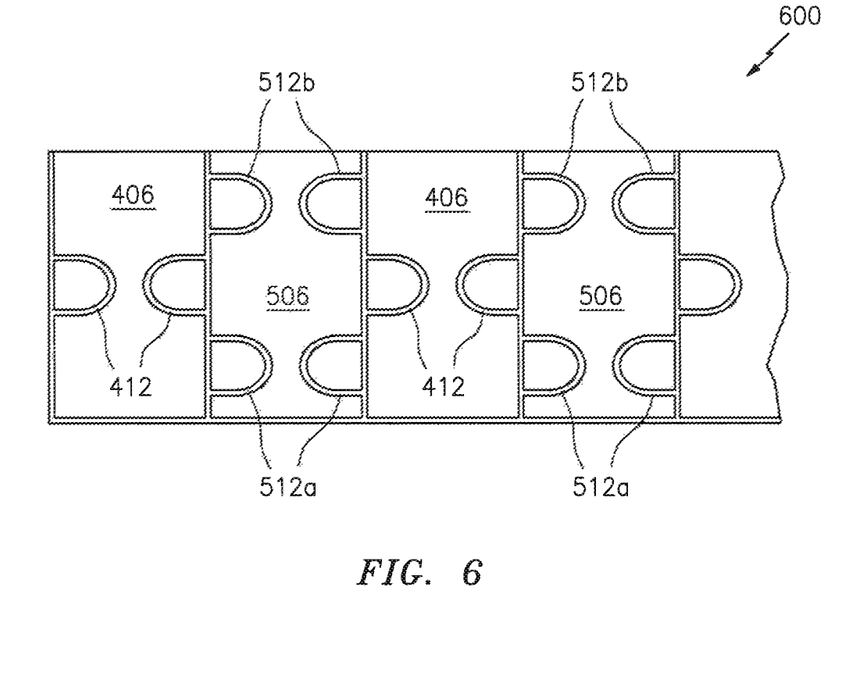

Referring to FIG. 6, a core 600 is shown. The core 600 may include a number of cells and/or inserts. For example, the core 600 may represent a combination of aspects of the cores 400 and 500 with an alternating pattern of: (1) cells 406/inserts 412 and (2) cells 506/inserts 512a and 512.

Figure 7:
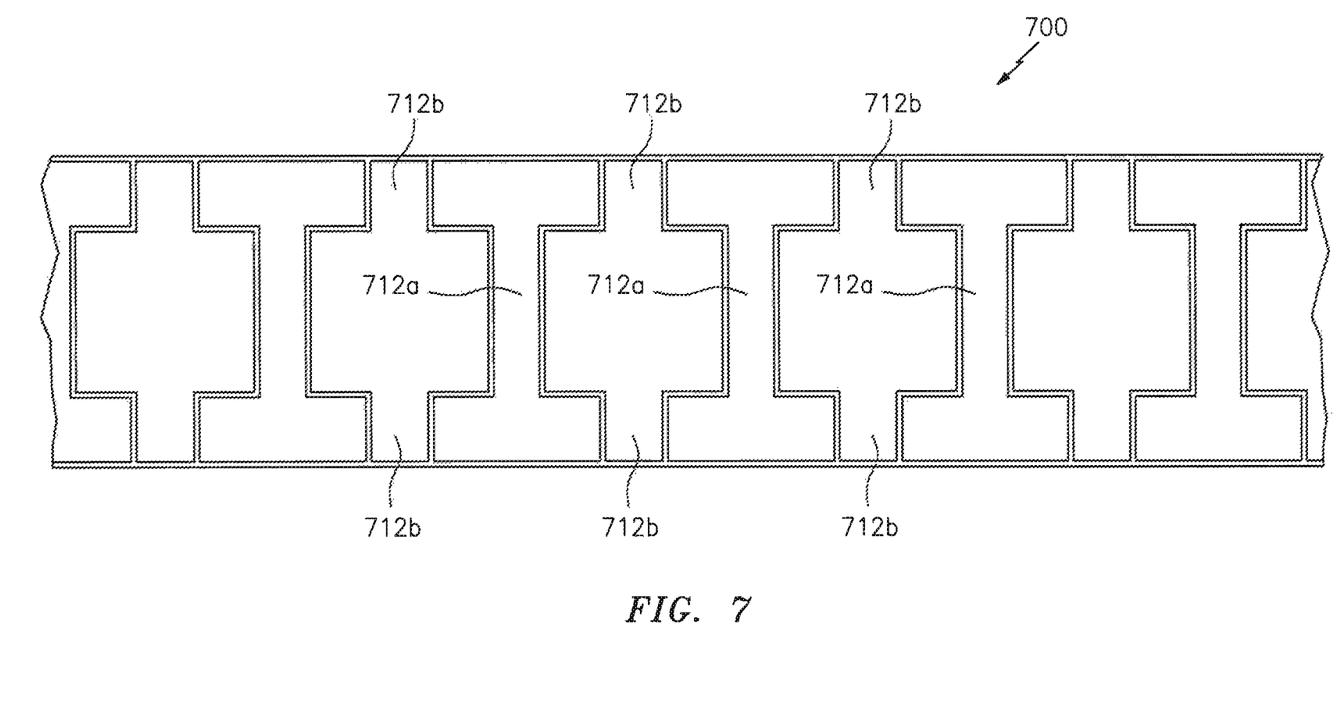

Referring to FIG. 7, a core 700 is shown. The core 700 may include a number of cells and/or inserts. For example, reference character 712a represents the inclusion of a single insert within a (first) cell, whereas reference character 712b represents the inclusion of two inserts within a (second) cell. In the example of FIG. 7, the insert 712 may be substantially located at the center of a cell. A first of the inserts 712b may be located at the upper portion of a cell and a second of the inserts 712b may be located at the lower portion of the cell.

Figure 9A:
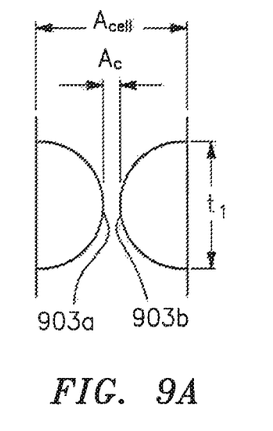
FIGS. 9A-9D illustrate various properties associated with cells and inserts in accordance with aspects of this disclosure.

Referring to FIG. 9A-9D, various geometries for inserts within cells are shown. FIG. 9A may be indicative of a circular arc or donut geometry and may correspond to FIGS.

Figure 9B:
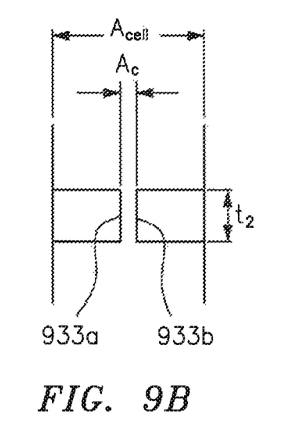
Figure 9C:
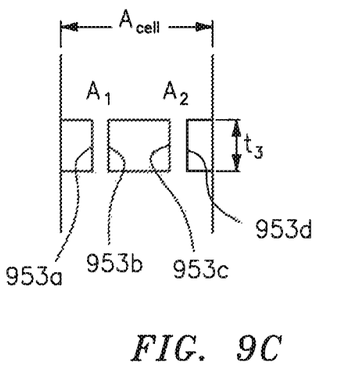
Figure 9D:
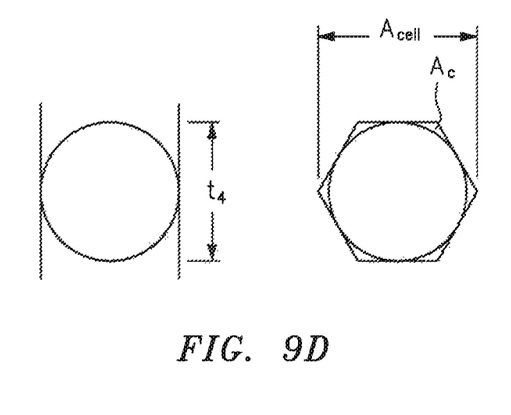

2A-2C described above. FIG. 9B may be indicative of a straight donut geometry and may correspond to FIGS. 3A-3B described above. FIG. 9C may be indicative of a parallel channel geometry and may be similar to FIGS. 3A-3B and 9B. FIG. 9D may be indicative of a "ball-in" arrangement and may correspond to FIG. 8 described above.

In FIG. 9A, edges 903a and 903b of an insert are shown as being separated from one another by a (minimum) distance $A_c$. The distance $A_c$ may be less than or equal to a distance $A_{cell}$ of the cell in FIG. 9A. For example, in FIG. 9A distance $A_c$ may be less than one-tenth (0.1) of the distance $A_{cell}$. The insert in FIG. 9A is also shown as having a thickness $t_1$ in a cell. One or more values for the thickness $t_1$ may be used.

In FIG. 9B, edges 933a and 933b of an insert are shown as being separated from one another by a distance $A_c$. Distance $A_c$ may be less than or equal to a distance $A_{cell}$ of the cell in FIG. 9B. For example, in FIG. 9B distance $A_c$ may be less than one-tenth (0.1) of the distance $A_{cell}$. The insert in FIG. 9B is also shown as having a thickness $t_2$ in a cell. One or more values for the thickness $t_2$ may be used.

The embodiment of FIG. 9B may provide substantially equivalent performance as the embodiment of FIG. 9A if $t_2$ is approximately equal to one-third (⅓) of $t_1$.

In FIG. 9C, edges 953a, 953b, 953c, and 953d of one or more inserts are shown. The edges 953a and 953b may be separated from one another by a distance $A_1$. The edges 953c and 953d may be separated from one another by a distance $A_2$. While the example shown in FIG. 9C relates to two separation distances $A_1$ and $A_2$ between edges of an insert, one skilled in the art will appreciate based on a review of this disclosure that more than two such separation distances may be provided in a given cell. In some embodiments, the total summation of the separation distances ($A_1$ and $A_2$ in the example of FIG. 9C) may be less than a distance An of the cell. For example, in FIG. 9C the summation of the distances $A_1$ and $A_2$ may be less than one-tenth (0.1) of the distance $A_{cell}$. The insert(s) in FIG. 9C is/are also shown as having a thickness $t_3$ in a cell. One or more values for the thickness $t_3$ may be used.

The embodiment of FIG. 9C may provide substantially equivalent performance as the embodiment of FIG. 9A if $t_3$ is approximately equal to one-third (⅓) of $t_1$.

In FIG. 9D, an insert is shown as having a thickness $t_4$ in the cell. One or more values for the thickness $t_4$ may be used. In FIG. 9D, the separation of the insert from the cell ($A_c$) may be less than a distance $A_{cell}$ of the cell. For example, in FIG. 9D distance $A_c$ may be less than one-tenth (0.1) of the distance $A_{cell}$. The embodiment of FIG. 9D may provide substantially equivalent performance as the embodiment of FIG. 9A.

While the examples described above in connection with FIGS. 9A-9D relate the parameters $A_C$, $A_{cell}$, and $t_1$-$t_4$ to distances, one skilled in the art would appreciate that the parameters of a cell or insert may be expressed in teains of more than one-dimension (e.g., area, volume, etc.) and that equivalent performance or structures between embodiments (e.g., between various geometries or profiles) may be obtained on the basis of varying one or more of the parameters.

In accordance with aspects of this disclosure, an insert may be used to constrict a flow/movement of fluid (ex., air) with a cell. In some embodiments, the insert may provide for a threshold amount of constriction. For example, in some embodiments, the insert may provide for at least 90% constriction.

Figure 10:
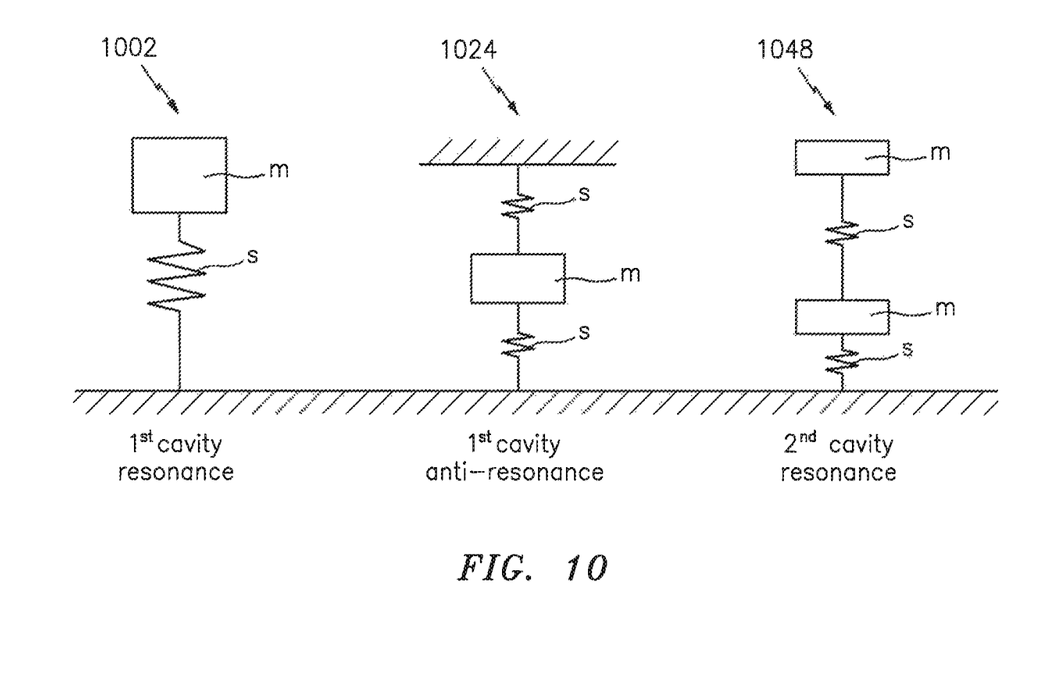
FIG. 10 illustrates a lumped-element model for drawing an analogy between use of an insert within a cell and a mass-spring based system.

The use of a constriction insert may be analogized to a lumped-element model. For example, FIG. 10 illustrates a lumped-element model incorporating one or more masses 'm' and one or more springs 's' that are shown for a $1^{st}$ cavity resonance condition 1002, a $1^{st}$ cavity anti-resonance condition 1024, and a $2^{nd}$ cavity resonance condition 1048. In particular, regions of a cell where a velocity of the fluid is greatest may behave like a mass 'm'. In contrast, regions where acoustic pressure of the fluid is maximum may behave like a spring 's' having an associated spring constant 'k'.

Continuing with the analogy, the effective modal mass near a velocity maximum is a function of the acceleration of the fluid in that vicinity. The addition of a constriction insert in this sector increases the local velocity due to the restricted flow area and consequently will behave as a system with increased inertia (mass). Although the flow restriction might seem like a reduction in the mass (reduced air volume), the acceleration effects of the change in cross sectional area produce the effective mass to increase. As an illustration focusing the $1^{st}$ cavity resonance condition 1002, the addition of a constriction insert close to the top of the cell effectively adds an incremental mass $m_2$ relative to a baseline mass $m_1$. The frequency of oscillation '$w_n$' associated with a spring 's' having a spring constant 'k' and loaded with the masses '$m_1$' and '$m_2$' may be expressed as:

$$w_n = \text{square root}[k/(m_1+m_2)]$$

In the above expression, given that the summation of the masses $m_1$ and $m_2$ appears in the denominator of the argument of the square root operation or function, the incremental mass $m_2$ represented by the addition of the constriction insert to the cell has a tendency to reduce the frequency $w_n$. Stated somewhat differently, the addition of a constriction insert provides for opportunities to modify acoustic behavior/output at a lower end of a frequency range, without necessarily increasing the acoustic panel thickness. Although the illustration above is focused on the $1^{st}$ cavity resonance condition 1002, one skilled in the art would draw similar conclusions for the conditions 1024 and 1048 provided the constriction is placed at other locations in the cell, e.g. near a velocity maximum for the corresponding condition 1024 or 1048.

The insert may be used to modify/tailor a tonal acoustic profile of a structure/core to adhere to one or more specifications/requirements. For example, the constriction provided by the insert may be adjusted/selected to provide for such a profile. In turn, the constriction that is obtained may he based on one or more parameters. Such parameters may include, for example:

(1) a count of inserts within a cell, (2) a location of an insert within a cell (e.g., a distance of the insert relative to a reference location [e.g., top or bottom] of the cell), (3) a size of an insert (e.g., in terms of the thickness 't' of the insert [potentially relative to a thickness 'T' of a cell] or a size [e.g., radius or diameter] of a (center) hole defined by the insert [potentially relative to a dimension of a cell]), (4) a shape/profile/geometry of an insert and/or a cell, In some embodiments, an insert may be manufactured with a cell as a common, monolithic piece. In some embodiments, the insert may be manufactured separately from the cell and then joined to the cell using one or more techniques (e.g., bonding, application of an adhesive, brazing, welding, etc.). An insert may be made of the same material as a cell. An insert may be made of one or more materials that are not used in the manufacture of a cell.

Technical effects and benefits of this disclosure include an ability to tailor/customize an acoustic/tonal profile associated with a core/structure by incorporating one or more inserts within one or more cells. In some embodiments, attenuation (in an amount greater than a threshold) of acoustic power (e.g., noise) at low frequencies (e.g., over a frequency range of 0-10 KHz, a subset of frequencies over the range 0-10 KHz, frequencies that are less than 1 KHz, or as potentially based on a size of a fan housed within a nacelle) may be obtained without incurring the penalty/expense of having to increase core thickness/depth. Aspects of the disclosure may be used to select or shift the resonant behavior/frequency of one or more cells (e.g., a hexcore cell) or a structure associated with the cell(s).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may he performed in other than the recited order, and that one or more steps illustrated may be optional in accordance with aspects of the disclosure. One or more features described in connection with a first embodiment may be combined with one or more features of one or more additional embodiments.

What is claimed is:

1. A structure comprising:
   a plurality of cells;
   a non-permeable first insert in a first cell of the plurality of cells, the first insert configured to constrict, by at least a first threshold amount, a flow of fluid in the first cell such that:
      acoustic power over a frequency range is attenuated by the structure by at least a second threshold amount, and
      a resonant frequency associated with the structure is shifted by at least a third threshold amount;
   wherein a surface of the first insert forms a hole that extends along an axis through the first insert, and a sectional geometry of the surface as viewed in a plane parallel to the axis is substantially round.

2. The structure of claim 1, wherein the first threshold amount is 90%.

3. The structure of claim 1, wherein the frequency range corresponds to 0-10 KHz.

4. The structure of claim 1, further comprising a non-permeable second insert, wherein the first insert is located at a first distance as measured from a bottom of the first cell, and wherein the second insert is located at a second distance as measured from the bottom of the first cell.

5. The structure of claim 4, wherein the first distance and the second distance are different.

6. The structure of claim 1, further comprising a non-permeable second insert, wherein the second insert is located in the first cell.

7. The structure of claim 1, further comprising a non-permeable second insert, wherein the second insert is located in a second cell of the plurality of cells.

8. The structure of claim 1, wherein each of the plurality of cells has a substantially hexagonal shape, and wherein the cells are arranged relative to one another to form a honeycomb profile.

9. The structure of claim 8, wherein outer edges of the first insert adhere to the shape of the first cell.

10. The structure of claim 1, wherein the frequency range and the second threshold amount are based on at least one of:
    a count of inserts within at least one of the cells,
    a location of the first insert within the first cell,
    a size of the first insert,
    a size of a hole defined by the first insert,
    a shape of the first insert, or
    a shape of the first cell.

11. The structure of claim 1, wherein the structure is configured to be incorporated in a nacelle of an aircraft.

12. The structure of claim 11, wherein the structure is configured to be incorporated in at least one of a translating sleeve or a blocker door.

13. The structure of claim 11, wherein at least one of the frequency range or the second threshold amount is based on a size of a fan housed within the nacelle.

14. The structure of claim 1, wherein the frequency range corresponds to 0-1 KHz.

15. The structure of claim 1, wherein the sectional geometry of the surface as viewed in the plane parallel to the axis is semi-circular.

16. A structure comprising:
    a plurality of cells;
    a non-permeable first insert in a first cell of the plurality of cells, the first insert configured to constrict, by at least a first threshold amount, a flow of fluid in the first cell such that:
       acoustic power over a frequency range is attenuated by the structure b at least a second threshold amount, and
       a resonant frequency associated with the structure is shifted by at least a third threshold amount;
    a non-permeable second insert in a second cell of the plurality of cells; and
    a non-permeable third insert in the second cell of the plurality of cells;
    wherein the first insert is substantially located at a center of the first cell, the second insert is substantially located at a top of the second cell, and the third insert is substantially located at a bottom of the second cell.

17. The structure of claim 16, wherein the first insert is a first distance from a bottom of the first cell, the second insert is a second distance from the bottom of the second cell, the third insert is a third distance from the bottom of the second cell, and the first distance is less than the second distance and greater than the third distance.

18. A structure, comprising:
    a plurality of cells comprising a first cell; and
    a non-permeable first insert arranged in the first cell, the first insert configured to constrict, by at least a first threshold amount, a flow of fluid in the first cell such that:
       acoustic power over a frequency range is attenuated by the structure by at least a second threshold amount, and
       a resonant frequency associated with the structure is shifted by at least a third threshold amount;
    wherein an aperture extends along a centerline through the first insert, the aperture is partially formed by an annular edge portion of the first insert, and the annular edge portion comprises a curved bevel.

19. The structure of claim 18, wherein the aperture is further partially formed by a second annular edge portion of the first insert, and the second annular edge portion comprises a curved bevel.

* * * * *

UNITED STATES PATENT AND TRADEMARK OFFICE
CERTIFICATE OF CORRECTION

PATENT NO. : 9,752,595 B2
APPLICATION NO. : 14/931508
DATED : September 5, 2017
INVENTOR(S) : Alonso-Miralles et al.

It is certified that error appears in the above-identified patent and that said Letters Patent is hereby corrected as shown below:

Column 4, Line 1, please delete "FIG. 313" and insert --FIG. 3B--.
Column 4, Line 9, please delete "FIG. 213" and insert --FIG. 2B--.
Column 4, Line 13, please delete "Shown" and insert --shown--.
Column 5, Line 56, please delete "tea ins" and insert --terms--.
Column 5, Line 63, please delete "ex." and insert --e.g.--.
Column 6, Line 49, please delete "he" and insert --be--.
Column 7, Line 22, please delete "he" and insert --be--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*